United States Patent

Totuka et al.

[11] 4,033,592
[45] July 5, 1977

[54] RECORD DISC CUTTING STYLUS

[75] Inventors: Kaoru Totuka; Isao Ohwaki, both of Tokyo; Masahiro Ohba, Yokohama; Shinji Nakamura, Tokyo, all of Japan

[73] Assignee: Victor Company of Japan, Limited, Yokohama, Japan

[22] Filed: Oct. 30, 1975

[21] Appl. No.: 627,195

[30] Foreign Application Priority Data

Nov. 1, 1974 Japan ............................ 49-126281

[52] U.S. Cl. .................................................. 274/38
[51] Int. Cl.² ......................................... G11B 3/44
[58] Field of Search ........................................ 274/38

[56] References Cited

UNITED STATES PATENTS

| 2,018,496 | 10/1935 | Keller | 274/38 |
|---|---|---|---|
| 2,530,284 | 11/1950 | Capps et al. | 274/38 |
| 2,627,416 | 2/1953 | Schoemehl et al. | 274/38 |

Primary Examiner—Steven L. Stephan

[57] ABSTRACT

A record disc cutting stylus comprises a cutting stylus body which is held at its upper end by a shank. At its lower end, there is a stylus tip portion which has a mirror surface, a relief surface with a relief angle γ, and a burnishing facet with a burnishing angle β and a burnishing facet width d. The burnishing angle β is as large as possible, and the width d and the relief angle γ are as small as possible. The stylus projects distance l between the lower end face of the shank and the extreme tip of the stylus tip portion, which projection is as small as possible. The burnishing angle β has a value substantially within a range of 25° to 40°; the burnishing facet width d is substantially within a range of 0.5 μm to 3.0 μm; the relief angle γ is substantially within a range of 30° to 40°; and the stylus projecting distance l is substantially less than 2.0 μm.

1 Claim, 10 Drawing Figures

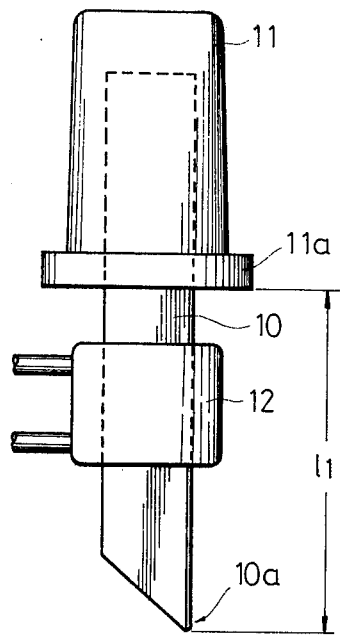
FIG. IA
PRIOR ART
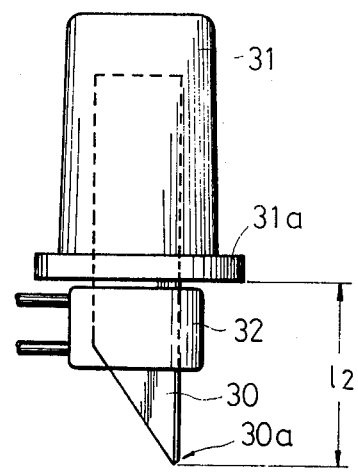
FIG. 3A
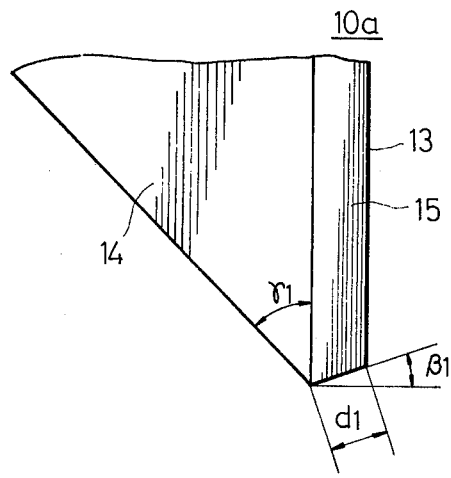
FIG. IB
PRIOR ART
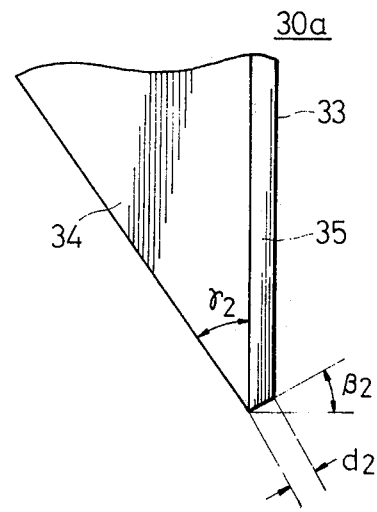
FIG. 3B

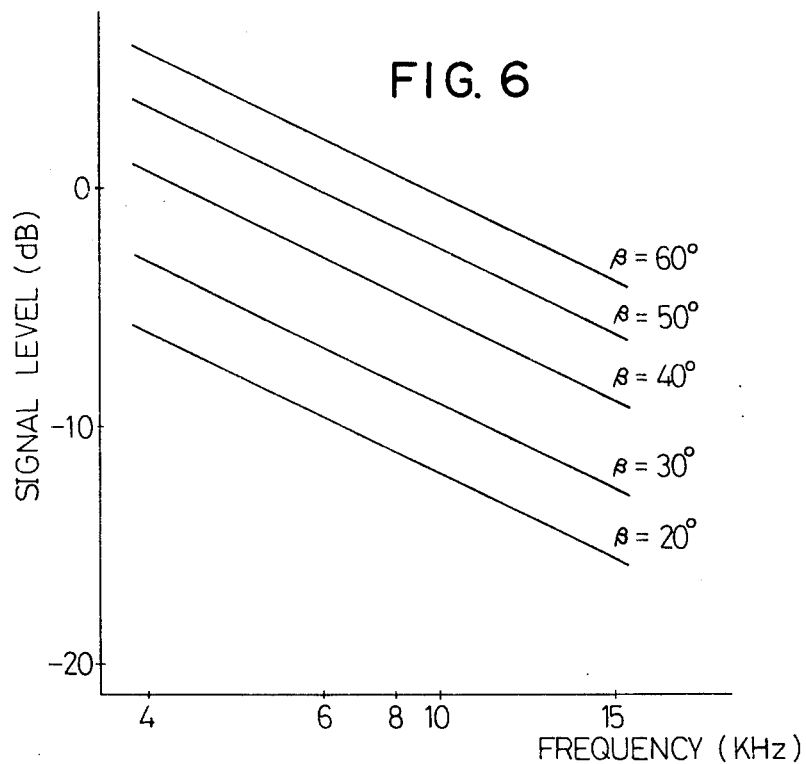
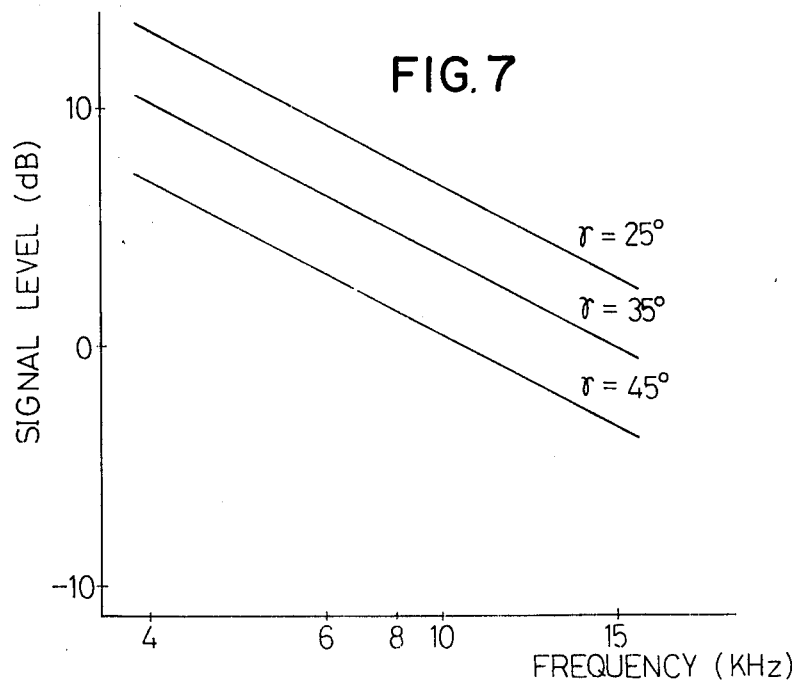

1

RECORD DISC CUTTING STYLUS

BACKGROUND OF THE INVENTION

The present invention relates generally to record disc cutting styluses and more particularly to a stylus for cutting and recording multichannel signals on a record disc.

A 4-channel record disc recording system is disclosed in U.S. Pat. Nos. 3,686,471 and 3,883,699. In this system, the signals of pairs of channels are matrixed to obtain respective sum and difference signals. Then, after a carrier wave of 30 KHz, for example, is angle modulated with a difference signal, the resulting angle-modulated difference signal of a band of 20 KHz to 45 KHz is multiplexed with a direct wave sum signal of a band of 30 Hz to 15 KHz. The signal thus multiplexed is cut and recorded on a record disc.

The sound groove of a record disc, which has a been cut in this manner has waveform resulting from the superimposition of a small amplitude angle-modulated difference signal of relatively high frequency on a large amplitude direct wave sum signal of relatively low frequency.

In the recording system of a conventional 2-channel stereo record disc, it is necessary merely to cut and record direct wave signals of the audio-frequency band. For this reason, any distortion in the conventional groove waveform is not perceived to any great degree by the auditory sensing of the reproduced sound. However, this nonperception is not true for a multichannel record disc on which a multiplexed signal of a direct wave signal and an angle-modulated signal is recorded. If there is a distortion in the groove waveform of the direct wave signal, there is a high-frequency component of the direct wave signal due to this distortion which becomes admixed within the band of the angle-modulated wave. Then there is an aggravation of cross-talk and noise. Furthermore, this distortion in the groove waveform of the direct wave signal shifts the phase of the angle-modulated wave signal that is recorded in a superimposed state relative to the direct wave signal. Undesired phenomena occur when the angle-modulated wave signal is reproduced.

There is a distortion when a signal is cut and recorded on a record disc by means of a conventional cutting stylus. The waveform of the groove has a considerable distortion due to the shape of the cutting stylus as will be described hereinafter with reference to the drawings. In a 2-channel stereo record disc, only direct wave signals are recorded and the distortion does not become a problem to the auditory sense. For this reason, little consideration has heretofore been given to the shape of the cutting stylus with respect to distortion. Consequently, when a multiplexed multichannel signal is cut and recorded with a conventional cutting stylus, the distortion gives rise to an impaired frequency characteristic and a cross-talk characteristic.

SUMMARY OF THE INVENTION

Accordingly, a general object of the present invention is to provide a novel and useful record disc cutting stylus for overcoming the above described problem.

Another object of the invention is to provide a stylus for cutting and recording signals on a record disc in an excellent manner without groove waveform distortion.

Still another object of the invention is to provide a stylus for cutting and recording signals on a record disc multichannel, and more particularly for recording a multiplexed direct wave signal and an angle-modulated signal, with excellent frequency characteristic and low cross-talk characteristic.

A further object of the invention is to provide a cutting stylus with geometrical features (such as burnishing angle, burnishing facet width, relief angle, and stylus tip length) which cut and record signals on a record disc in an excellent manner without waveform distortion.

Further objects and features of the invention will be apparent from the following detailed description when read in conjunction with the accompanying drawings.

BRIEF DESCRIPTION OF THE DRAWINGS

In the drawings:

FIGS. 1A and 1B are respectively a side elevation of one example of a conventional record disc cutting stylus and an enlarged side elevation of its stylus tip;

FIGS. 3A and 3B are respectively a side elevation of one embodiment of a record disc cutting stylus according to the invention and an enlarged side elevation of its stylus tip;

FIG. 6 is a graph indicating the maximum input level at which distortionless cutting and recording is possible in which burnishing angle is taken as a parameter; and FIG. 7 is a graph indicating the maximum input level at which distortionless cutting and recording is possible, in which the relief angle is taken as a parameter.

DETAILED DESCRIPTION

Figure 2:
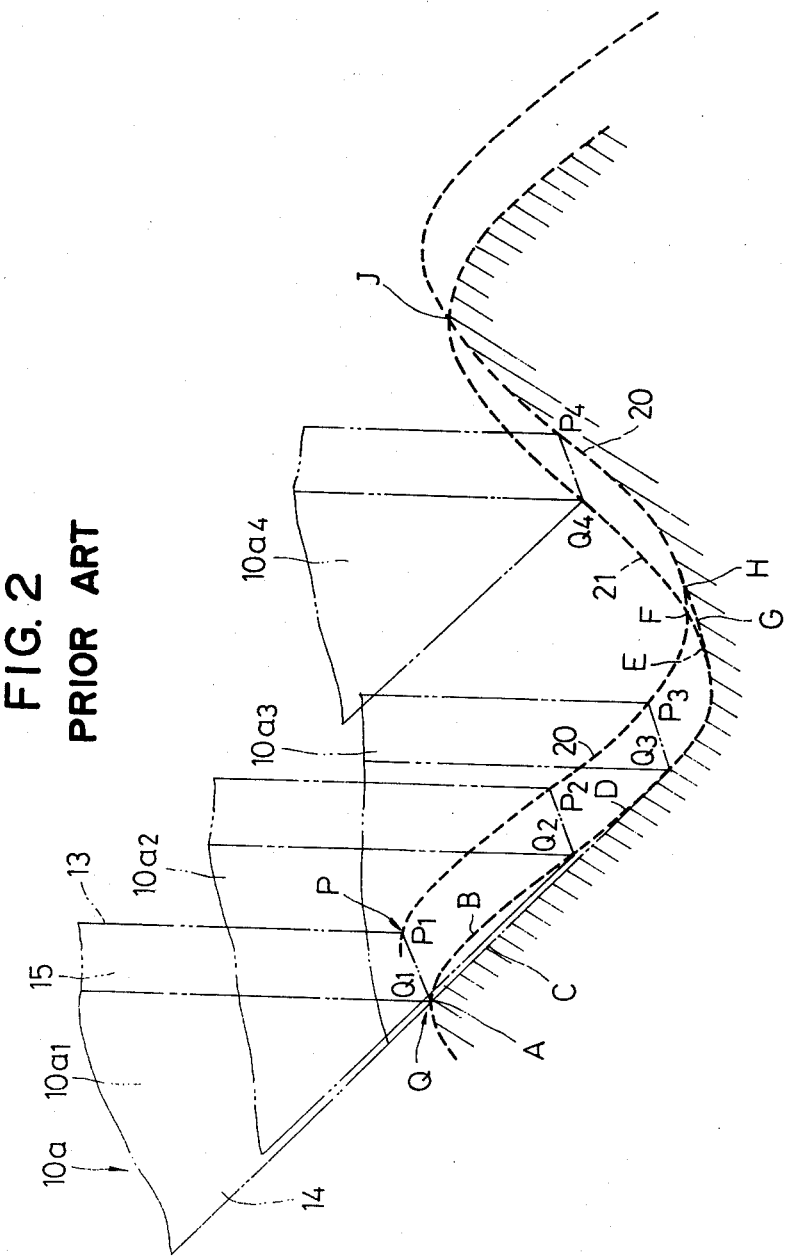
FIG. 2 is a graphical representation of the manner in which a signal is cut by the known cutting stylus illustrated in FIGS. 1A and 1B, with distortion.

As conducive to a full understanding of the nature and utility of the present invention, an example of a known cutting stylus will first be briefly considered, with reference to FIGS. 1A and 1B. This cutting stylus comprises essentially a cutting stylus body 10, a shank 11 holding the upper part of the stylus body 10, and a heating coil 12 wound around the middle part of the stylus body. The tip 10a of the stylus body 10 has a shape as shown in FIG. 1B. This tip 10a has a mirror surface 13 and a relief surface 14, between which is a burnishing facet 15 of a width $d1$. Burnishing facet 15 and has a burnishing angle $\beta1$ and a relief angle $\gamma1$. The distance between the lower face of a flange 11a, formed at the lower part of the shank 11, and the extreme tip end of the tip 10a of the cutting stylus body 10 will be detoned by $l1$. Then, one example of a known cutting stylus has a shape defined by the following values:

$$d1 = 4\mu m, \beta1 = 20°, \gamma = 45°, l1 = 2.2mm.$$

An input signal of, for example, a frequency of 10 KHz and a level of 6 dB (wherein 0dB = 5.0 cm/sec. in the horizontal direction), cut and recorded by a known cutting stylus, will be described with reference to FIG. 2.

The tip of this cutting stylus is driven by the above defined input signal, to cut and form a groove as it continuously moves over the record disc (FIG. 2) from the position 10a1, along the path indicated successively by 10a2, 10a3, 10a4, . . . . During this operation, the point P of the lower end of the mirror surface 13 moves through points P1, P2, . . . , tracing a locus indicated by broken line 20. At the same time, the point Q of the lower end of the relief surface 14 moves through points Q1, Q2, . . . , tracing a locus indicated by broken line 21.

When the locus of only the point Q is taken in the locus segment between point A and point D, a groove is formed wherein the line passing through points A, B, and D is the outer contour. In an actual case, however, the part surrounded by the points A, B, and D is cut by the relief surface 14. The outer contour becomes a line passing through the points A, C, and D. Between points D and E, the groove follows the locus of the point Q. When only the loci of points P and Q are considered between points E and H, the groove should be a combination locus passing through points E, F, and H. In an actual case, however, the groove is cut by the burnishing facet 15, and becomes the line passing through points E, G, and H.

Between points E and J, the normal groove is that indicated by the line 21, which is the locus of the point Q. In actual practice, it becomes a groove as indicated by the line passing through the points E, G, and H (as described above) and the line 20 which is contiguous thereto and is the locus cut by the point P. Accordingly, the actual groove from the point A to the point J assumes a shape indicated by the hatched lines and passing through the points A, C, D, E, H, and J, as the outer contour. The groove beyond the point J becomes a repetition of the waveform after the point A.

The record disc groove should be cut along the line 21, which is the locus of the point Q, that is, the waveform of the line passing through the points A, B, D, E, F, and J. Instead the groove is unnecessarily cut, as described above, between the points A and D and between the points E and J. The groove waveform thus cut acquires a distortion.

If the recorded signals are only direct wave signals, as mentioned above, a distortion of the above mentioned order is recorded. The reproduced signal will not be much of a problem with respect to the auditory sense. However, if the recorded signal is a multiplexed signal of a direct wave signal and an angle-modulated wave signal, and if there is a distortion as mentioned above, certain parts of the signal will be lost. (This is the signal wherein an angle-modulated wave signal is superimposed with a high frequency and small amplitude on the above mentioned waveform). Or, the groove may be cut at positions which are displaced from the positions where it should be cut, whereby a phase shift occurs in the signal. This phase shift becomes a problem at the time of demodulation. Furthermore, at the time of reproduction, the high-frequency component, due to distortion of the direct wave signal, may become admixed in the angle-modulated wave band.

In addition, a prior art cutting stylus has a projection length l1 of the stylus body 10 which is set at a large value of 2.2 mm. For this reason, the twist of the stylus body 10 becomes a problem. The vibration of the input signal is not transmitted with high fidelity to the stylus tip 10a.

Figure 4A:
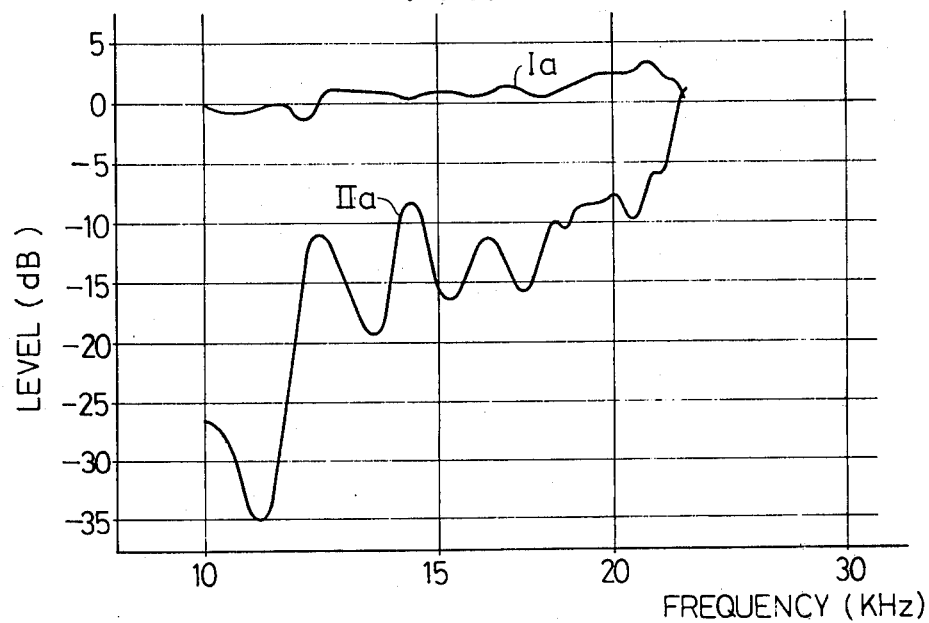
FIGS. 4A and 4B are graphs respectively indicating the frequency characteristics and the cross-talk characteristics of signals cut and recorded by a known cutting stylus and by the cutting stylus of the invention.

The above described features of the known cutting stylus may be collectively summarized by curves Ia and IIa in FIG. 4A, respectively indicating the frequency characteristic and the cross-talk characteristic of the stylus.

The present invention provides a cutting stylus capable of cutting and recording signals on a record disc, with a groove which is substantially free of distortion. This inventive cutting stylus will now be described with respect to one embodiment thereof, as illustrated in FIGS. 3A and 3B.

The cutting stylus body 30 is made of a diamond or sapphire and is held at its upper part by a shank 31. The remainder of the stylus body 30 projects out of the shank 31a. A heating coil 32 is wound therearound in the vicinity of a flange 31a formed at the lower end of the shank 31. The heating coil 32 heats the stylus body 30, and comprises a small diameter wire wound into a coil and covered by a heat-resistant cement applied over the outer surface thereof. This heating coil 32 is smaller than the heating coil 12 around a conventional cutting stylus.

The stylus tip 30a of this cutting stylus body 30 has a shape as indicated in FIG. 3B. More specifically, this stylus tip portion 30a has a mirror surface 33, which is the front face of the stylus, facing in the direction of the relative advance of the stylus body 30 during cutting of the record disc. The stylus also has a relief surface 34, which is the rear face. A burnishing facet 35, of a width d2, is between the mirror surface 33 and the relief surface 34. The burnishing angle is denoted by $\beta2$, and the relief angle is denoted by $\gamma2$. The distance between the lower surface of the flange 31a of the shank 31 and the extreme tip end of the stylus tip 30a is denoted by l2. Then, the shape of one exemplary cutting stylus according to the present invention can be specified by the following values:

$$d2 = 2\mu m, \beta2 = 30°, \gamma2 = 35°, l2 = 1.2 \text{ mm}.$$

Figure 5:
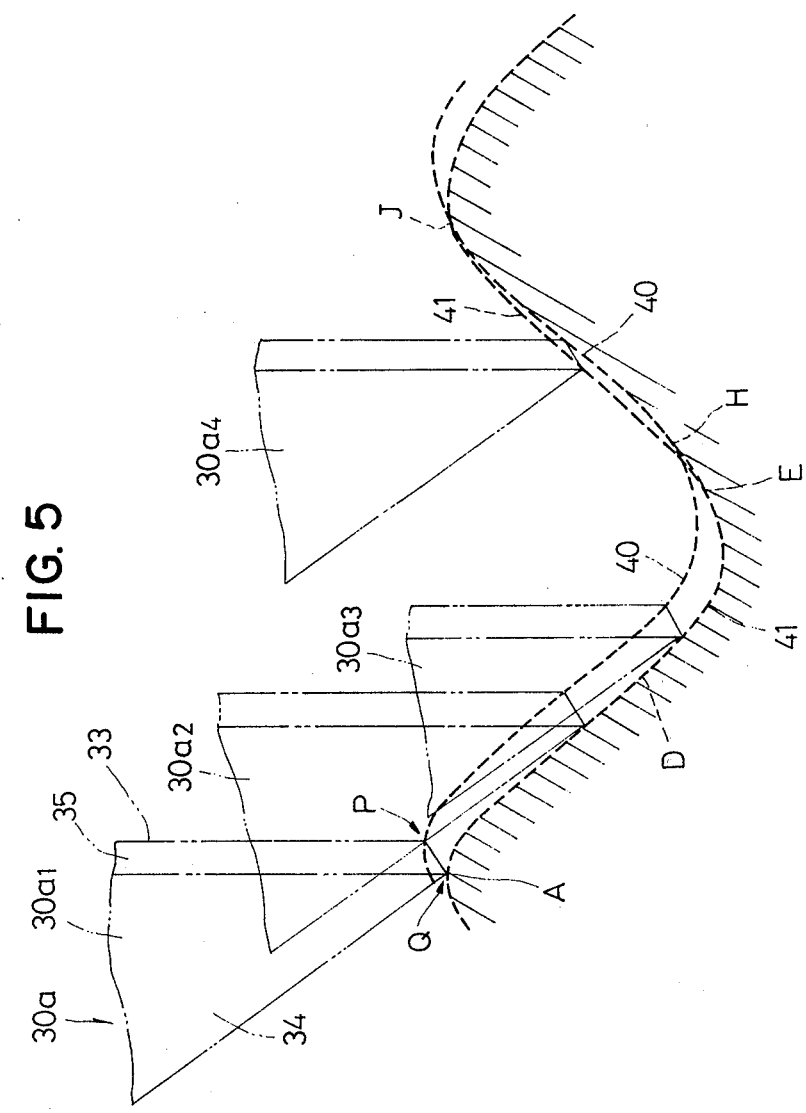
FIG. 5 is a graphical representation of the manner in which a signal is cut by the cutting stylus of this invention, illustrated in FIGS. 3A and 3B.

The manner in which this stylus cuts and records on a record disc responsive to an input signal of, for example, a frequency of 10 KHz and a level of 6 dB (0 dB being 5.0 cm/sec. in the horizontal direction) will now be described with reference to FIG. 5.

The stylus tip 30a is driven by the input signal to cut and form a groove as it advances continuously relative to and over the surface of a record disc, from the position denoted by 30a1 successively through points 30a2, 30a3, 30a4, . . . . During this operation, the point P at the lower end of the mirror surface 33 and the point Q at the lower end of the relief surface 34 respectively trace loci indicated by broken lines 40 and 41.

In the interval from point A to point E, the groove is shaped by the point Q by following the locus of broken line 41, passing through points A, D, and E. In this segment, there is no unnecessary cutting by the relief surface 34, which occurs with a conventional cutting stylus. Instead the signal is cut and recorded with an accurate groove.

In the segment from point E to point J, the portion between points E and H is slightly cut by the burnishing facet 35. The portion between points H and J is cut along the line indicated by the broken line 40, which is the locus of the point P. However, in the segment between points E and J, the discrepancy between the lines 40 and 41 is very small, as is apparent from a comparison of the degree of this discrepancy with the discrepancy between lines 20 and 21, in FIG. 2. Consequently, the signal is cut and recorded with very small distortion in the segment from point E to point J.

Therefore, the groove, between from the point A and the point J, assumes a shape as indicated by hatched lines. The outer contour of the groove is a line passing through points A, D, E, H, and J. Since the distortion is very slight, there is no missing part of the angle-modulated wave signal which is cut in a state of superimposition on this direct wave signal. Furthermore, its phase shift is very small. In addition, there is only a very small high-frequency component due to distortion of the direct wave signal. There is only a little possibility of high frequency becoming admixed within the angle-modulated wave band to cause a deleterious phenomenon.

Another feature of the cutting stylus, according to the invention, is that the projecting length 12 of the stylus body 30 is short, i.e., 1.2 mm. For this reason, a possible twisting of the stylus body 30 is held to a minimum. The input signal is faithfully transmitted to the vibration of the stylus tip 30a.

Figure 4B:
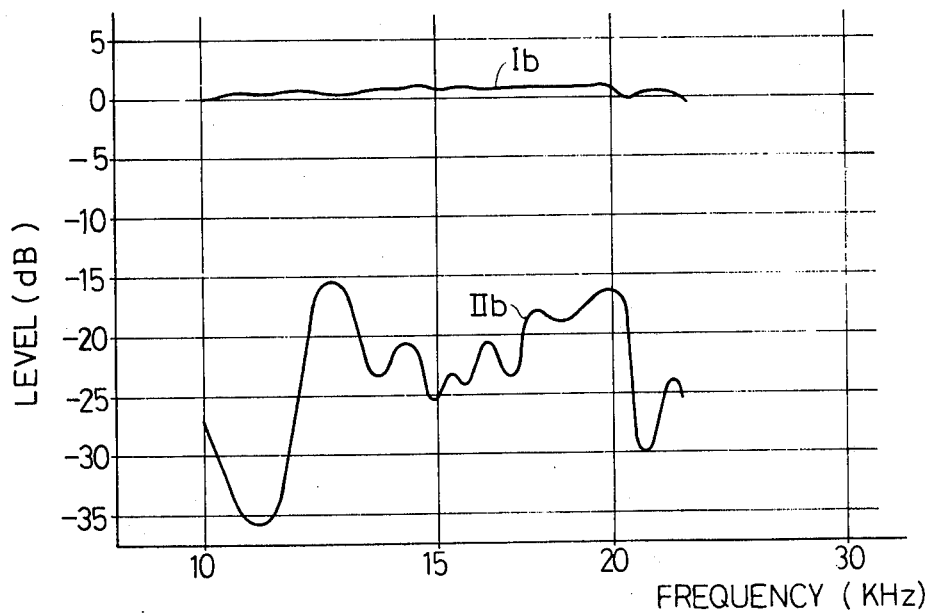

Frequency and cross-talk characteristics are indicated respectively by curves Ib and IIb in FIG. 4B. These curves collectively summarize the above described features of the inventive cutting stylus. As is apparent from a comparison of FIGS. 4A and 4B, the frequency characteristic Ib of the inventive cutting stylus is more flat than the characteristic Ia of the known stylus. The characteristic cross-talk level, curve IIb, of the inventive stylus is much lower than the, cross-talk characteristic IIb of the known stylus. Therefore, both the frequency characteristic and cross-talk characteristics of the inventive stylus are excellent.

Next, FIGS. 6 and 7 show the maximum signal levels at which cutting and recording is possible without distortion for various values with burnishing angle $\beta$ and relief angle $\gamma$ as parameters. In both of these graphs, the signal levels decrease with a slope of $-6$ dB/oct with increasing frequency. This scope conforms to the RIAA characteristic. Both graphs indicate values which are measured at a position that is 140 mm. (in the radial direction) away from the center of rotation of the record disc. In this connection, 0 dB is 5.0 cm/sec. in the horizontal direction.

As is apparent from FIG. 6 the maximum signal level at which distortionless cutting and recording is possible increases with increases in the burnishing angle $\beta$. Accordingly, when viewed from this viewpoint only, a large angle $\beta$ is desirable. However, if the angle $\beta$ becomes too large, the burnishing effect cannot be fully realized. Therefore, in accordance with the present invention, the burnishing angle $\beta$ is selected within a range of approximately 25° to 40°.

As the width $d$ of the burnishing facet becomes smaller, there is a more desirable result. However, if this width $d$ is too small, the burnishing effect will disappear. For this reason, the burnishing facet width $d$ is selected within a range of approximately 0.5 $\mu$m to 3.0 $\mu$m.

Furthermore, as is apparent from FIG. 7, the maximum signal level at which distortionless cutting and recording is possible increases with a decreasing relief angle $\gamma$. Accordingly, when viewed from this viewpoint only, a small relief angle $\gamma$ is desirable. However, if this angle $\gamma$ is too small, the mechanical strength of the stylus tip will be low. For this reason, the relief angle $\gamma$, in accordance with the present invention is selected within a range of approximately 30° to 40°.

In addition, there is a more desirable result if the distance l from the lower face of the flange of the shank to the extreme tip of the stylus is made shorter. Since a heating coil must be wound around the stylus body in this region, this distance l is selected within a range from approximately 2.0 mm to a lower limit which is limited only by the factors of fabrication.

Further, this invention is not limited to these embodiments. Many variations and modifications may be made without departing from the scope and spirit of the invention.

What is claimed is:

1. A cutting stylus for recording multiplexed signals on a record disc, said signals comprising a direct wave signal and an angle modulated signal, said stylus comprising a cutting stylus body having a stylus tip portion for cutting a groove on the record disc and a shank holding the upper part of the stylus body, said stylus tip portion having a mirror surface at the front part thereof which faces in the direction in which cutting advances relative to the record disc, a burnishing angle in the range of approximately 25° to 40°, a relief surface in the range of approximately 30° to 40° at the rear part of said tip portion, and a burnishing facet having a width in the range approximately 0.5 $\mu$m to 3.0 $\mu$m between the mirror surface and the relief surface, the distance l from the lower end face of the shank to the extreme tip end of the stylus tip being within a range from approximately 2.0 mm to a lower limit which is determined by factors of fabrication, the stylus operating at a maximum signal level which decreases with a slope of $-6$dB/octave with increasing frequency.

* * * * *